United States Patent [19]

Sibalis

[11] 4,134,050

[45] Jan. 9, 1979

[54] DOOR ACTIVATING MOTOR CONTROL APPARATUS

[76] Inventor: Dan Sibalis, 90 Gold St., New York, N.Y. 10038

[21] Appl. No.: 762,271

[22] Filed: Jan. 25, 1977

[51] Int. Cl.² .................................................. H02P 1/08

[52] U.S. Cl. ......................................... 318/267; 49/28; 361/192; 361/189

[58] Field of Search ....................... 49/28, 26; 318/267, 318/288, 290, 261, 266, 257, 206 A; 361/191, 192, 189

[56] References Cited

U.S. PATENT DOCUMENTS 3,654,535 4/1972 Hendry et al. ....................... 318/267

*Primary Examiner*—Herman J. Hohauser

*Attorney, Agent, or Firm*—Hopgood, Calimafde, Kalil, Blaustein & Lieberman

[57] ABSTRACT

Improved door activating motor control apparatus employs a self latching safety edge relay which is selectively energized by any of "open", one-button universal or obstruction-sensing safety edge contacts. A motor controlling contactor switch has its "open" direction coil and contact portion operated by safety edge relay contacts, and its "close" relay portion operated under control of a "close" or the one-button switch.

The composite control apparatus of the instant invention exhibits significant operational advantages over prior art structures including, inter alia, frequency exercise of safety edge relay contacts, responsiveness to the "open" switch in an emergency situation, and retention of an obstruction sensing signal to cause door opening.

12 Claims, 4 Drawing Figures

DOOR ACTIVATING MOTOR CONTROL APPARATUS

DISCLOSURE OF THE INVENTION

This invention relates to electrical control/actuator apparatus and, more specifically, to improved structure for openings and closing a door or the like.

Figure 1:
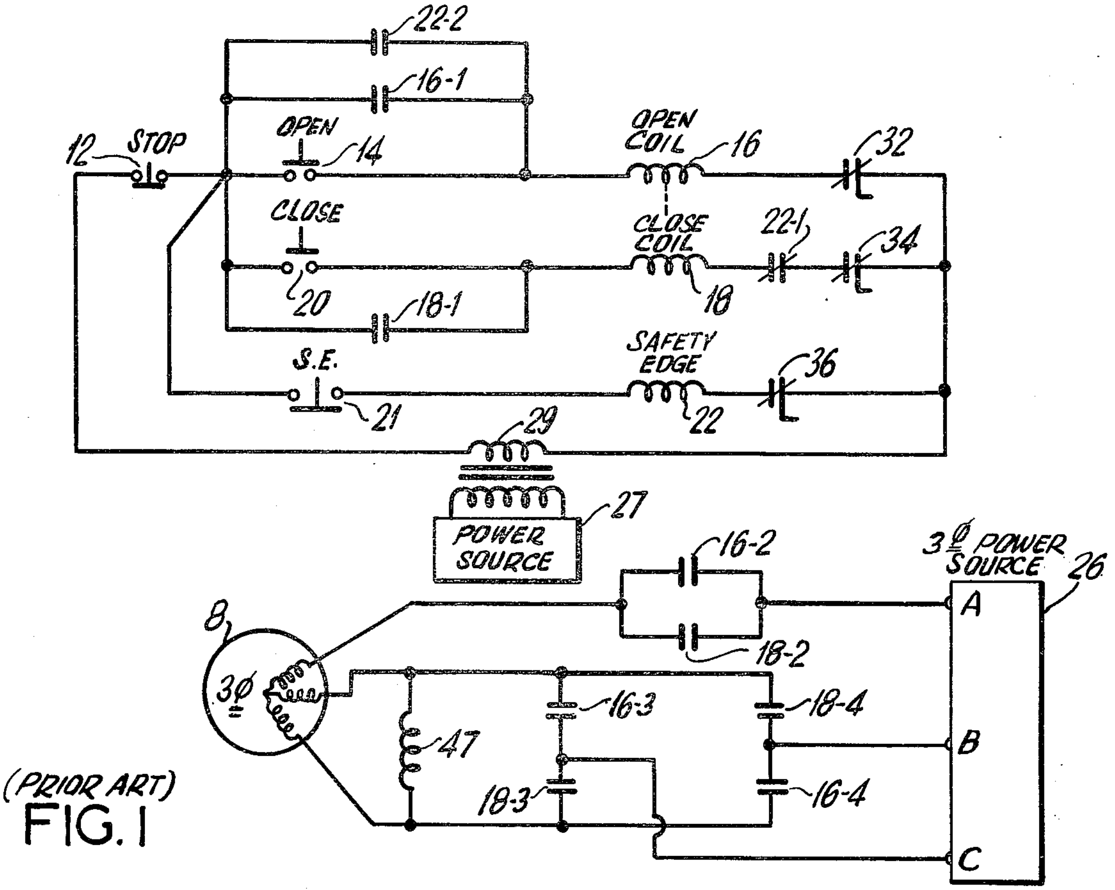
(PRIOR ART) FIG. 1

Prior art motor control arrangements for implementing powered door opening/closing and the like have been characterized by various deficiencies. Thus, for example, FIG. 1 depicts a typical prior art motor control circuit for selectively actuating a three phase motor 8, that is, a circuit for opening, closing or stopping a controlled door, e.g. a garage door, which is translated by the rotor of motor 8 via suitable gearing.

In its fundamental aspects, assuming that the door is at rest in any but its fully opened position, depressing an "open" push button switch 14 energizes an "open" relay coil 16 from a power source 27 via the secondary winding 29 of a transformer, a normally closed "stop" push button switch 12, the activated "open" switch 14, and a normally closed "open-direction" limit switch 32. Once energized, the coil 16 is latched to an energized state via normally open contacts 16-1 connected in parallel with the "open" switch 14.

The energized coil 16, which may advantageously be part of a reversing motor contactor switch of common usage, also closes contacts 16-3 and 16-4 of a bridge circuit thereby applying AC energy from the "B" and "C" output ports of a three phase power source 26 to two windings of the three phase motor 8. The now closed contacts 16-2 of the excited "open" coil 16 similarly energize the third winding of the motor 8 with the "A" power phase. Further, a brake release solenoid 47, if utilized, is energized by the closed contacts 16-3, 16-4 (power phases "B" and "C") to free the motor rotor. Thus, the motor 8 is fully activated and turns in a direction to open the controlled door, the "open" direction being determined by the specific application of the "B" and "C" power phases to the motor windings.

The motor 8 will continue to move the door in the "open" direction until either: (a) the "stop" button 12 is pushed; or (b) the limit switch 32, e.g. a microswitch which senses the end of travel for the door approaching the fully opened position, becomes open circuited. Each will be discussed in turn.

When the door is opening and the "stop" switch 12 is activated, i.e., becomes open circuited, the energizing path for the "open" relay coil 16 through the latching "open" coil relay contacts 16-1 is broken, thereby de-energizing the coil 16. This open circuits contactor terminals 16-2, 16-3 and 16-4, thereby disconnecting each of the motor 8 windings from the three phase power source 26 and stopping the motor. It is also observed that the potential between the three phase supply ports "B" and "C" is also removed from the brake release solenoid 47, hence permitting the motor brake to re-engage and stop the motor 8. Similarly, an open limit switch 32, signalling the end of travel to the fully opened position, gives rise to an essentially identical mode of operation since it is also in series with the "open" coil 16 and "open" coil latching contacts 16-1.

Correspondingly, in an analogous mode of operation, momentarily depressing the "close" switch 20 energizes the "close" relay coil 18 via the normally closed "stop" switch 12, the normally closed contacts 22-1 of a safety edge relay discussed below, and the normally closed contacts of a "close direction" limit switch 34. The closed relay is latched on by contacts 18-1 connected in parallel with the "close" push button 20.

As before, contacts 18-2, 18-3 and 18-4, on the "close" relay side of the motor controlling contactor switch, connect the three-phase power phases "A", "B" and "C" to the three windings of the three phase motor 8, but reversing the connections between the motor windings and the power phases "B" and "C". This again activates the motor 8, but causes it to rotate in the opposite, or "close-door" direction. Further, the polarity insensitive break-release solenoid 47 is energized to free the motor shaft for rotation. The activated motor 8 will continue to open the door until either the stop button 12 is depressed to stop the door in some intermediate position by de-energizing the closed relay coil 18, or the door becomes fully closed whereupon the "closed door" position-sensing limit switch 34 de-energizes the coil 18, together with its ancillary motor controlling contacts 18-2, 18-3 and 18-4.

With respect to the door closing mode of operation, prior art door controlling embodiments have employed what is known as a safety edge switch 21, which is a normally opened contact pair having a sensing element located about the bottom edge of the door such that the contacts close when the door strikes an obstruction in its path towards a closed position. The safety edge switch may comprise, for example, an inflated pneumatic tube secured along the bottom of the door coupled to a pressure sensitive switch. The pressure sensitive switch, per se well known to those skilled in the art, may comprise a diaphragm which, when extended by a pressure impulse from the tube, forces the two electrical contacts together. Thus, when an obstruction is engaged, the pressure is increased on one side of the diaphragm, closing the switch contacts 21.

Should the safety edge switch 21 engage any obstruction, the safety edge relay coil 22 is energized by the transformer secondary winding 29 acting through the "stop" switch 12, the activated safety edge sensing contacts 21, and a normally closed contact pair 36 which opens only when the door approaches its fully closed position. The contacts 36 are employed to defeat the safety edge circuitry when an obstruction is engaged at the very end of the travel of the door to its closed position, for example, where snow is disposed beneath the closing door.

When the safety edge coil 22 is activated, the normally closed safety edge relay contacts 22-1 open, thereby deenergizing the "close" coil 18 and removing power from the motor 8.

The above considered prior art control circuitry is subject to several attendant potentially serious disadvantages. First, in an emergency situation where the door is about to strike an individual or object as it is closing, a normal reaction is to depress the "open" button 14, rather than the "stop" button 12. However, engagement of the "open" button 14 will have no effect and will not stop the door from continuing to close under power. Rather, activating the "open" switch 14 while the door is closing merely energizes the "open" relay coil 16 in addition to the "close" coil 18 which was already energized after the "close" switch 20 was originally depressed. Since the "open" relay 16 and close relay 18 are ganged in a single motor reversing contactor switch, energizing the coil 16 will not change the activated status of the contacts 18-2, 18-3, and 18-4 and the open status of the contacts 16-2, 16-3 and 16-4.

Thus, the door will continue to be powered in its close direction, and possibly injure the person or object in its path.

Further, this injury may well not be avoided by the safety edge apparatus 21–22. In particular, in the prior art arrangement, the safety edge contacts 21 are engaged only when obstruction is sensed which is a relatively infrequent event. Thus oxides may develop on the safety edge relay contacts 22-2 such that when the contacts 22-2 are needed in an emergency, they may not provide any electrical signal and thus may simply not perform reliably.

The above considered FIG. 1 prior art arrangement is directed to a three phase motor controller, where it is a relatively simple matter to reverse the direction of rotation of the motor by switching any two of the applied voltage phases. That is not the case for a single phase motor, which is next considered.

Figure 2:
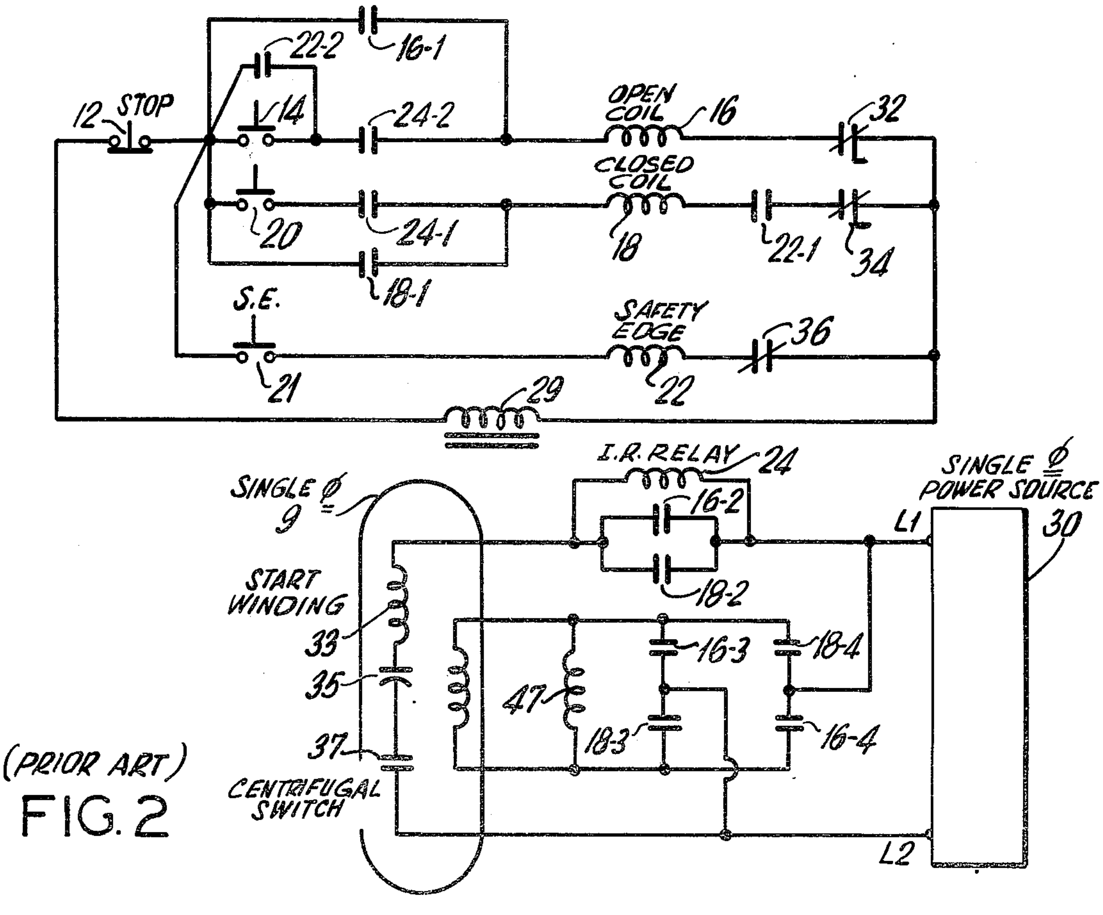
(PRIOR ART) FIG. 2

FIG. 2 shows a prior art arrangement for controlling a noninstant reversible, single phase motor 9, which is the most commonly used and certainly least expensive of the motors used in the controlled door industry. The non-instant reversible single phase motor 9 comprises a field, or run winding 32 connected across the two output, mains 1 and 2 of a single phase power source 30 when either contacts 16-3 and 16-4, or 18-3 and 18-4 are closed by "open" and "close" relay coils 16 and 18. In FIG. 2 and, indeed throughout the application, like reference numerals are used to identify like elements. Further included in the non-instant reversing single phase motor 9 is a starting winding 33, a phase shifting starting capacitor 35 and normally closed centrifugal switch 37 which opens when the motor is rotating at a rate above a minimal speed in either direction.

The difficulty which must be addressed in using such a motor for door actuation is that the direction of rotation of the motor will not change, once the motor shaft is turning at more than a minimal rate in either direction, by reversing the source line windings L1 and L2. Thus, the circuitry of FIG. 2 must include apparatus for treating this condition.

We do not review here the basic operation of the "open" and "close" switches 14 and 20, the "stop" switch 12, or the safety edge apparatus 21, 22 which perform in a manner discussed above with respect to the FIG. 1 prior art arrangement. However, note the inclusion of an instant reversing relay coil 24 in parallel with the switch contacts 16-2 and 18-2. The instant reverse relay coil 24 is energized whenever the start winding 33 is actively connected in place — for the common motor 9 shown in FIG. 2 this corresponds to the motor being at rest or substantially so when the centrifugal switch contacts 37 are closed. Normally open instant reverse relay contacts 24-2 and 24-1 are connected in series with the "open" and "close" switches 14 and 20 and serve to defeat any attempt to control the apparatus through those switches when the instant reverse relay coil 24 is not energized, i.e., when the start winding 33 is not connected into place and thus when the motor 9 may not be reversed in direction in any event.

Thus, when a door controlling circuitry of the FIG. 2 type is utilized, limitations are placed upon when reversal may occur. Thus, for example, if a door closing operation has begun, the door may not be opened until the motor starting winding 33 has been reconnected, which occurs in the case of the FIG. 2 circuitry when the centrifugal switch 37 closes (rotor of motor 9 substantially stopped). The same limitation occurs for a closing operation after the door has been opened.

Also note that a momentary closure of the safety edge sensor 21 will serve to stop the door from closing by momentarily opening contacts 22-1 in series with the "close" latching contacts 18-1. However, the active or closed state for sensor contacts 21 will likely not persist long enough to open the door via contacts 22-2 which are disabled by reversal relay contacts 24-2 while the motor 9 still turns — obviously a disadvantage in an emergency situation.

In addition to the matters specifically discussed above, the FIG. 2 arrangement suffers those other attendant disadvantages heretofore considered with respect to the FIG. 1 arrangement.

It is an object of the present invention to provide an improved door activating control circuit arrangement.

More specifically, it is an object of the present invention to provide an improved door actuating control arrangement which obviates the above-discussed difficulties attendant prior art such arrangements; which readily employs plural, remote, one-button stations; which frequently exercises the safety edge relay and contacts thereby obviating oxidation of same; and which is amenable to explosion proof construction.

Figure 3:
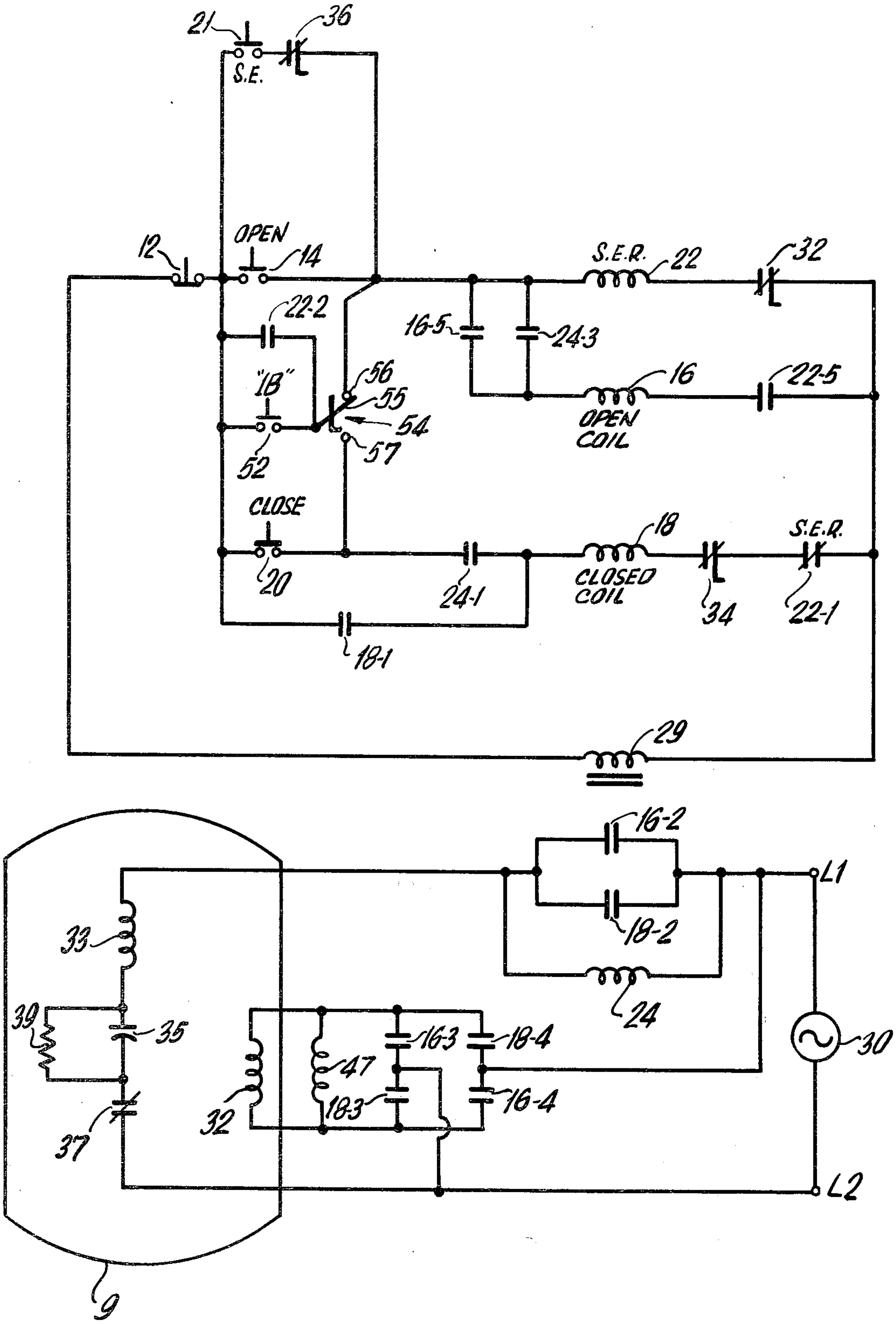
Figure 4:
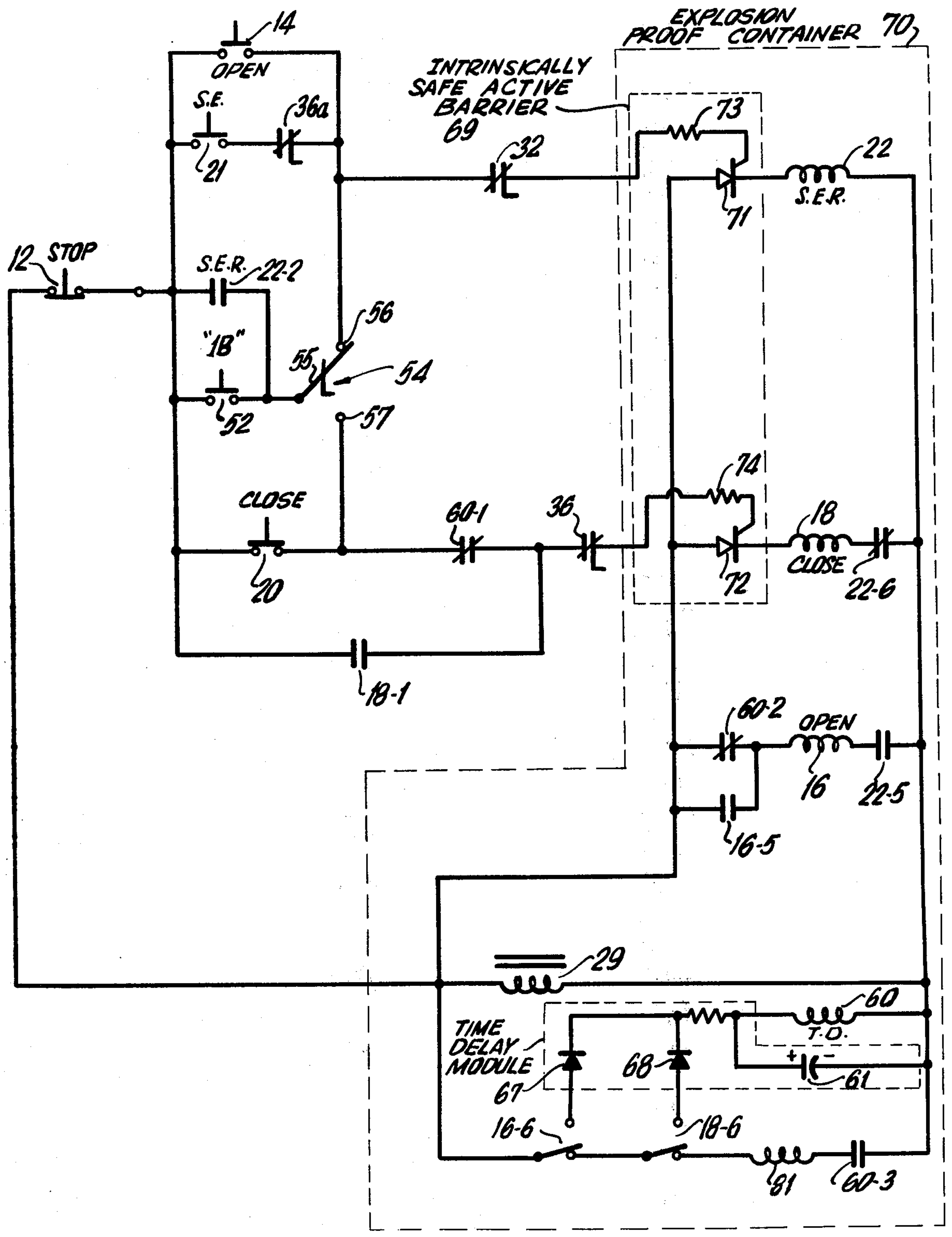

The above and other objects, features and advantages of the present invention will become clear from the following detailed description of embodiments of the present invention, discussed hereinbelow in conjunction with the accompanying drawing, wherein:

FIGS. 1 and 2 are schematic diagrams of prior art door actuation controller arrangements above-discussed; and FIGS. 3 and 4 schematically depict first and second door actuating/control embodiments incorporating the novel features of the present invention.

Referring now to FIG. 3, there is shown an arrangement in accordance with the principles of the present invention for actuating a control door or the like — as via a single phase non-instant reversible motor 9, and under control of "open", "close", "stop" and safety edge input sensors 14, 20, 12 and 21 of the type and significance discussed above. To consider first operation of the FIG. 3 arrangement in a door opening mode, closure of the "open" switch 14 energizes the safety edge relay coil 22 (and not the open coil 16 as was heretofore the case) via the normally closed "stop" switch 12, the "open" switch 14 and the open position limit switch 32 from the secondary transformer winding 29 connected to an A.C. power source. The activated safety edge relay coil 22 closes contacts 22-2 which latch the relay 22 into an active state via a transfer switch 54. The switch 54 resides in the position shown unless the controlled door is fully open, and is used for purposes below discussed. The contacts 22-2 are thus exercised each time the door goes through an opening operation, thereby obviating the build up of oxides or other performance-inhibiting spurious surface insulators.

Assuming the motor 9 is initially at rest, the instant reverse relay 24 is energized, and thus the closed contacts 22-2 energize the "open" relay coil 16 through the instant reverse relay contacts 24-3 and the now closed contacts 22-5 of the safety edge relay 22. Once energized, the "open" relay coil 16 latches on via its contacts 16-5. The motor 9 is turned on by closed contact 16-2, 16-3 and 16-4 and thus starts and rotates in the door open direction.

As before, the door-opening action of the motor 9 will be terminated if the open limit switch 32 senses end of travel in the opening direction by de-energizing the safety edge relay 22, and thereby also the "open" relay 16 via the safety edge relay contact 22-5. Both relay coils 16 and 22 are similarly de-energized by opening stop switch 12 serially connected to the latching contacts of both relays. Some reflection will also show operation for closing is directly analogous to that above-discussed with respect to "close" switch 20, instant reverse contacts 24-1, close relay latching contact 18-1, the closing limit switch 34, and normally closed contacts 22-1 of the safety edge relay.

Should an emergency condition occur where the safety edge sensor contacts 21 become short circuited, and the safety edge performance not be defeated by the end of travel limit switch 36, the safety switch sensor 21 provides an "open door" signal in parallel with the closure of the switch 14. This signal operates the safety edge relay 22 and "open" relay 16 in a manner identical to that above discussed, to cause the door to in fact open after the motor shaft has stopped turning to the point where the starting winding 33 is connected back into circuit. However, in contrast to the prior art circuitry of FIG. 2, the momentary closure of safety edge contacts 21 will not be lost since this information is preserved in the now actuated and latched relay 22 such that the motor 9 will reverse to the open direction as soon as it slows down, reconnecting the start winding 33. With both coils 16 and 18 de-energized at such time, motor braking is aided since the brake release solenoid 47, if employed, is similarly de-energized.

Several advantages are observed for the FIG. 3 arrangement vis-a-vis the prior art arrangements of FIGS. 1 and 2. First, in a panic situation, momentarily actuating the "open" button 14 will cause the motor 9 to stop closing the door, and to open the door after the motor 9 stops. This follows from the latching operation of the safety edge relay responsive to the "open" switch 14, rather than having the "open" switch control the "open" relay 16 directly. It will be recalled that in the prior art arrangements of FIGS. 1 and 2, if the "open" switch 14 rather than the "stop" switch 12 were depressed, the "open" coil 16 will be energized but ineffective. Then, also, as discussed above, a short single edge safety pulse at contacts 21 is preserved by the latching operation of the safety edge relay 22 by contacts 22-2, and thus will cause the door to open and clear the obstruction situation as soon as possible. This is a distinct improvement over the FIGS. 1 and 2 arrangements, and especially that of FIG. 2, where the safety edge pulse of contacts 21 might well have disappeared by exhaustion of air through the automatic safety switch before instant reverse contacts 24-2 would permit actuation of the "open" coil 16 via safety edge contacts 22-2. Further, as above discussed, the safety edge contacts 22-2 are exercised each time an open operation occurs and thus do not oxidize and are available when needed.

A bleeder resistor 39 may be connected in parallel with the motor 9 starting capacitor 35 in FIG. 3 to completely discharge the capacitor 35 which thus starts from a known, zero voltage state each time the instant reverse coil 24 is actuated when the motor is at or near rest. This eliminates the very severe relay 24 chattering which is observed in the field when the relay 24 is actuated by closure of the centrifugal switch contacts 37 where the voltage stored in the capacitor 35 starts from a random, possibly large value of either plurality, depending upon its condition at the time the contacts 37 opened.

Further, with respect to the FIG. 3 arrangement, there is shown a so called "one button" normally open control switch 52 which may be physically located anywhere in a facility and, indeed, there may be any number of such one button switches, electrically connected in parallel, at various points in a facility. Depressing any one button switch 52 will first cause the door to become fully open if it is not already in that position. Once fully open, another actuation of the one button switch 52 will cause the door to close and so forth. The single pole double throw limit switch 54 is shown with its transfer member 55 being in a position corresponding to the door being in other than its fully opened position. The switch 54 is a travel sensitive switch mechanically coupled to the door to report on its instantaneous position. With the door other than fully open and the switch 54 in the state shown in the drawing, depression of the switch 52 will identically model a depression of the open switch 14 and cause the door to open in the manner above discussed. Similarly, should the door be fully open so that the switch transfer member 55 engages the lower contact 57, actuation of any switch 52 would represent to the circuitry a closure of the "close" switch 20 causing the door to close in the manner above described.

Finally, it is noted that the FIG. 3 apparatus (and that of FIG. 4 below discussed) may be utilized with minor modification readily apparent to those skilled in the art with any motor type. Thus, the three phase motor and switch contactor organization of FIG. 1 may directly be employed, the instant reverse coil and contactor simply being deleted as unnecessary.

Turning now to FIG. 4, there is shown a further embodiment of the present invention which includes an intrinsically safe barrier 69 within an explosion proof container 70 including silicon controlled rectifiers 71 and 72, together with ancillary gate resistors 73 and 74 and various other components described below. The motor and motor controlling contactor switches are not shown in FIG. 4 — any of the motor configurations in any of FIGS. 1 through 3, or other arrangements well known to those skilled in the art, may be employed. In its basic operation, the circuitry of FIG. 4 functions in a manner directly analogous to that of FIG. 3, and will not be explained in detail. The principle distinction between the FIG. 4 arrangement and that of FIG. 3 is the use of the explosion proof container 70 containing all the elements shown within the dashed area 70 in the drawing, which are all of the elements in the circuit capable of producing a spark. Also contained within the bounds of the explosion proof container 70 are the contacts 16-2, 16-3 and 16-4, and 18-2, 18-3 and 18-4, i.e., the motor contactor elements, which are obviously also potentially spark producing members.

Resistors 73 amd 74 connected to the gate terminals of the silicon controlled rectifiers 71 and 72 limit to very low, dry, non-sparking values the current flowing in the exposed external circuit elements.

The SCR 71 effectively acts as a power amplifier, driving the safety edge coil 22 when the gate terminal is energized via the gate resistor 73 by the "open" switch 14, safety edge sensor 21, the one button switch 52, or the like. Similarly, the SCR 72 and gate resistor 74 act as a power amplifier for selectively actuating the "close" relay coil 18 by a very low, dry current switching load passing through the "close" switch 20 or one button switch 52.

Further with respect to the explosion proof application, further "open" and "close" relay contacts 16-6 and 18-6 are adapted to be in their upper position shown in the drawing when the corresponding relay is activated and not otherwise. When the motor employed is energized in either direction, one or the other of a diode 67 or 68 is respectively excited each half cycle of the A.C. potential applied by the transformer secondary winding 29, and energizes a time dealy coil 60. A capacitor 61 is included in parallel with the coil 60 and charges to a voltage sufficient to maintain the time delay relay 60 on.

When the motor comes to rest after an energized condition because of any circuit functioning above described, both of the contacts 16-6 and 18-6 assume their lower position, and a time delay relay contact pair 60-3 remains closed for a period of time following motor de-energization through the action of the energy stored in the capacitor 61 discharging through the time delay relay coil 60. This completes the circuit through a brake relay winding 81 (together with contacts 16-6 and 18-6 and time delay relay contacts 60-3) which closes contacts to electrically or dynamically brake the motor in any manner known in the art — e.g., by closing a contact pair connected in shunt with the motor winding 32 for the motor shown in FIG. 3. This dynamic braking lasts as long as the energy stored in the capacitor 61 is of a sufficient voltage level to supply at least holding current to the time relay coil 60.

It is also observed that contacts associated with the time delay relay winding 60 perform the function of the instant reversal contacts shown in the arrangements of FIGS. 2 and 3. In particular, contacts 60-1 are opened for this relatively short period of time following motor de-energization to disable any "close" signal from either the one button switch 52 or the "close" switch 20. Similarly, normally closed contacts 60-2 open for the short period of time following motor de-energization to prevent activation of the "open" relay coil 16. It is further noted, however, that the time delay relay 60 does not prevent operation of the safety edge relay 22 such that the motor may be reversed any direction once the time delay period ends.

Thus, the door activating and controller apparatus of the instant invention has been shown by the above to perform all door operating functions in an improved, reliable manner.

The above-described embodiments are merely illustrative of the principles of the present invention. Numerous modifications and adaptations thereof will be readily apparent to those skilled in the art without departing from the spirit and scope of the present invention.

What is claimed is:

1. In combination in door actuating and control apparatus, a safety edge relay coil, an open-direction switch serially connected with said safety edge relay coil, first normally open safety edge relay contacts and safety edge sensor switch means each connected in parallel with said open-direction switch, an open-direction relay coil and second normally open safety edge relay contacts serially connected to said open-direction relay coil for selectively energizing said open-direction coil when said safety edge relay is actuated, and a close-direction switch, self-latching close-direction relay coil and first normally closed safety edge relay contacts all serially connected for selectively energizing said close-direction coil when said safety edge relay coil is not energized.

2. A combination as in claim 1 futher comprising first, normally closed, close-direction limit switch means serially connected with said safety edge sensor switch means.

3. A combination as in claim 2 further comprising second, normally closed, open-directon limit switch means serially connected with said safety edge relay coil.

4. A combination as in claim 3 further comprising third normally closed, close-directon limit switch means serially connected to said close relay coil.

5. A combination as in claim 1 further comprising a transfer switch having a transfer member and first and second terminals, a one-button station connected to said transfer member, one of said transfer switch contacts being connected to said open-direction switch an the other of said contacts being connected to said close-direction switch.

6. A combination as in claim 1 further comprising a non-instant reversible single phase motor including a run winding, a starting winding, a starting capacitor and normally closed centrifugal switch means serially connected with said starting winding and said starting capacitor, an instant reverse relay coil serially connected with said starting winding, said starting capacitor, and said centrifugal switch, first normally open instant reverse relay contacts serially connected with said open relay coil, and second normally open instant reverse relay contacts serially connected with said close switch.

7. A combination as in claim 6 further comprising normally open, open-direction relay contacts connected in parallel with said first instant reverse relay contacts.

8. A combination as in claim 6 further comprising first, second and third additional normally open, open-direction and close-direction relay contacts, said first open-direction and said first close-direction additional relay contacts being connected in parallel with said instant reverse relay coil, said second and third open-direction and close-direction additional relay contacts being connected in a bridge configuration and further connected to said motor run winding.

9. A combination as in claim 1 further comprising first and second controlled rectifier, power amplifier means respectively connected between said open-direction switch and said safety edge relay coil, and between said close-direction switch and said close-direction relay coil.

10. A combination as in claim 9 further comprising open-direction relay transfer switch means and close-direction relay transfer switch means each having a transfer member and first and second contacts a time delay relay coil and a capacitor connected in parallel with said time delay coil, and first and second diodes each having alike electrode connected to said time delay relay coil and their other electrode connected to a first contact of a different one of said transfer members in said transfer switch means.

11. A combination as in claim 10 wherein said second contact on one of said transfer switch means is connected to the transfer member of the other of said switch means, and further comprising a brake relay and a normally open time delay relay contact pair serially connected to the second contact on the other of said transfer switch means.

12. A combination as in claim 11 further comprising normally closed time delay relay contacts serially connected to said open-direction relay coil.

* * * * *